G. E. GARON.
SPRING WHEEL.
APPLICATION FILED OCT. 25, 1909.
974,765.
Patented Nov. 1, 1910.
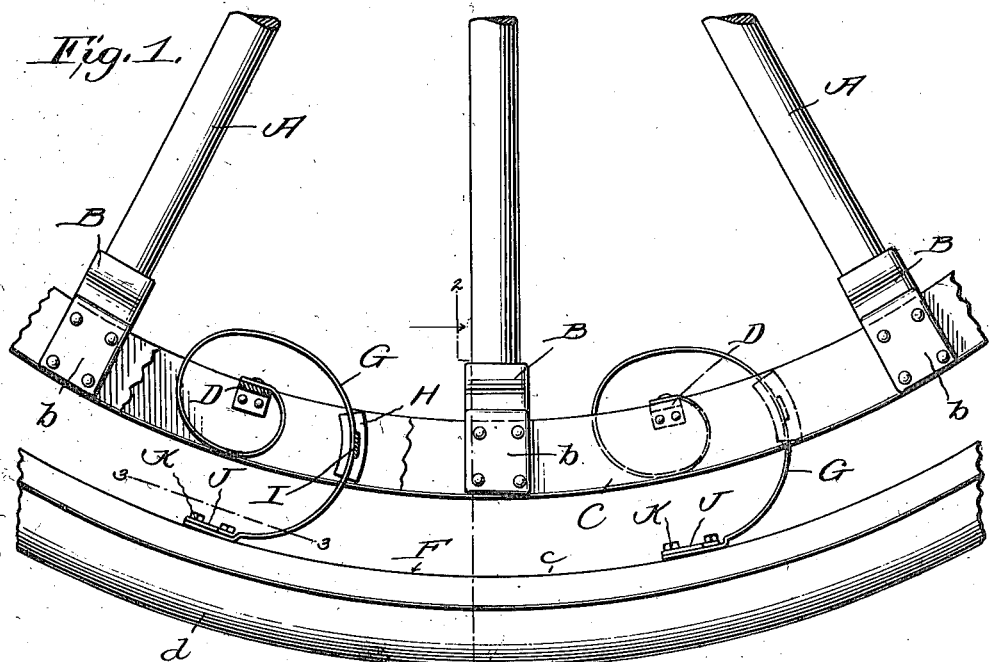
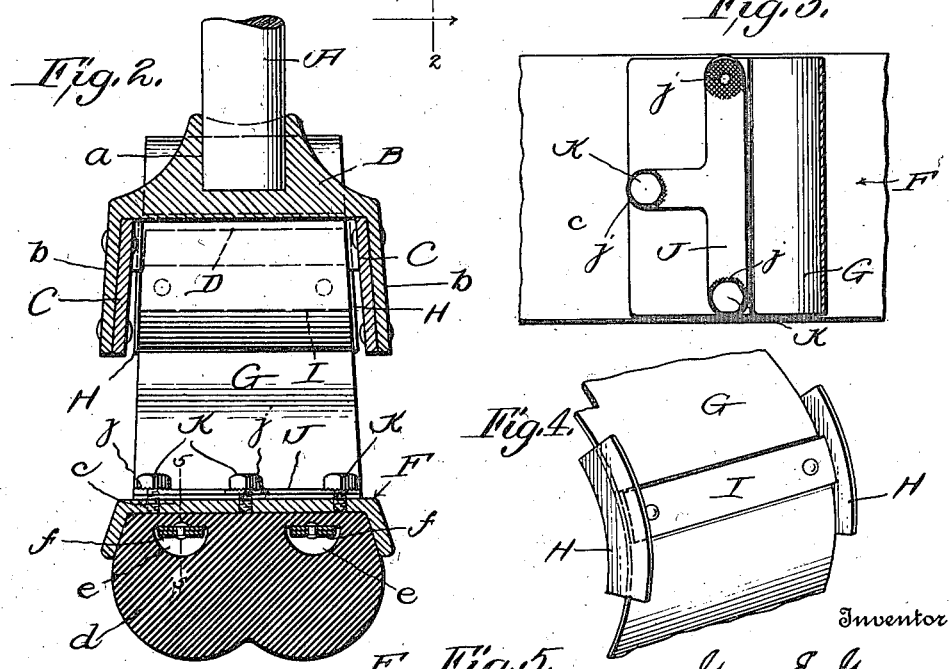
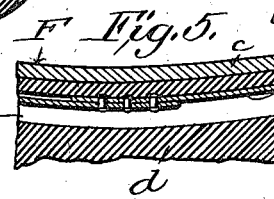
Inventor
George E. Garon.

UNITED STATES PATENT OFFICE.

GEORGE E. GARON, OF MANCHESTER, NEW HAMPSHIRE.

SPRING-WHEEL.

974,765.

Specification of Letters Patent. Patented Nov. 1, 1910.

Application filed October 25, 1909. Serial No. 524,419.

*To all whom it may concern:*

Be it known that I, GEORGE E. GARON, citizen of the United States, residing at Manchester, in the county of Hillsboro and State of New Hampshire, have invented new and useful Improvements in Spring-Wheels, of which the following is a specification.

My present invention has to do with vehicle wheels embodying metallic springs; and it has for its general object to provide a simple, compact and inexpensive construction calculated to absorb shocks when a wheel encounters an obstruction or uneven place in a road, and one susceptible of being easily repaired, and well adapted to withstand the rough usage and strain to which the wheels of automobiles and other heavy vehicles are ordinarily subjected. My invention also has the merit of not being affected by nails, pieces of glass or other cutting devices engaged by the tire tread; and its novelty, utility and practical advantages will be fully understood from the following description and claims when the same are read in connection with the drawings, accompanying and forming part of this specification, in which:

Figure 1 is a side elevation, partly in section, of so much of a vehicle wheel as is necessary to illustrate the preferred specific embodiment of my invention. Fig. 2 is a transverse section taken in the plane indicated by the line 2—2 of Fig. 1. Fig. 3 is a detail section taken on the line 3—3 of Fig. 1, looking downwardly. Fig. 4 is a detail perspective view showing the wear plates or shoes on one of the springs comprised in the wheel. Fig. 5 is a detail longitudinal section taken on the line 5—5 of Fig. 2, and showing the manner in which the ends of the metallic bands inside the elastic tread are connected together.

Similar letters designate corresponding parts in all of the views of the drawings, referring to which:

A A are the spokes of the wheel which may be joined to the hub, (not shown) in the conventional or any other manner consonant with the purpose of my invention. The said spokes may be of wood or metal, and are provided at their outer ends with brackets B of the general configuration shown in Fig. 2. When the spokes A are of wood, as in the present embodiment of the invention, the brackets B are provided with sockets $a$ which snugly receive the outer ends of the spokes as shown.

Fixed to the sides $b$ of the brackets B are annular plates C, and bridging the space between the said plates are cross-bars D that are riveted or otherwise fixed with respect to the plates. The said cross-bars D may be arranged at suitable intervals and at any desired points relative to the brackets B, without affecting my invention, but I prefer to arrange the same at the points shown intermediate the brackets B so as to admit of the employment of long metallic springs.

The brackets B combined with the annular plates C constitute the inner annular member of the wheel, and the said inner annular member is separated by an intervening space as shown, from the outer annular member F. The said outer member F may be of any construction compatible with the purpose of my invention, without involving departure from the scope thereof, though I prefer to have it comprise a metallic rim $c$, of channel form in cross-section, an elastic tread $d$ formed of rubber and canvas, or of any suitable composition, and having one or more (preferably two) bores $e$, and metallic bands $f$ arranged in the said bores and having their ends lapped and riveted together after the manner shown in Fig. 5. The tread $d$ is shown of the twin type, but it is obvious that it may be of the single type without affecting my invention. It will also be obvious that the bores $e$ render the tread comparatively light and increase the cushioning capacity thereof, while the bands $f$ assist materially in strongly holding the tread in the channel-shaped rim $c$.

G G are the springs of the wheel, and inasmuch as the said springs are identical in construction, a detailed description of the one shown in Figs. 2 and 4 will suffice to impart a definite understanding of all. The said spring G, Figs. 2 and 4, is connected in a fixed manner at one end to one of the cross-bars D, and is curved, as shown, and connected at its outer end with the inner side of the outer annular member F of the wheel. On its edges the spring is provided with wear plates or shoes H, which are arranged opposite the inner sides of the annular plates C, as shown. The said wear plates or shoes H are fixed to or formed integral with a cross-bar I, and the said cross-bar I is arranged against and riveted or otherwise fixedly connected with the spring. From this it follows that when the wheel is making a turn and the spring is deflected laterally, one of the shoes H will bring up against and move on the inner side of the adjacent plate C, and in that way will prevent injury to the spring and materially prolong the usefulness of the wheel as a whole. The outer end of the spring is preferably connected to the inner side of the rim c in the manner shown—that is to say, a spring plate J of about the form illustrated, is arranged on the outer portion of the spring, and machine screws K are driven through apertures in the plate J and the end portion of the spring G and into threaded sockets in the rim c. The spring plate J is normally concavo-convex, and is arranged with its concave side toward the center of the wheel. It will also be noted by reference to the drawings that around its screw holes the said plate is provided with roughened surfaces j designed to coöperate with similar surfaces on the under sides of the screw heads. Thus when the screws K are driven home, the spring plate J will be pressed into a flat state, and put under tension, whereupon the roughened surfaces j of the plate by coöperating with the roughened surfaces of the screw heads will effectually prevent casual loosening of the screws.

It will be understood from the foregoing that all of the springs G are connected in the manner described, and that in consequence the said springs will serve to effectually absorb all shocks and strains, and this notwithstanding the wheel is not, like a wheel equipped with a pneumatic tire, liable to be put out of commission by a cut in the tread. I would also have it understood that in addition to cushioning the wheel and obviating all tire trouble, my novel wheel construction is calculated, by virtue of its resiliency, to absorb the shock incidental to changing the speed of or starting a motor vehicle, and in that way the said wheel construction tends to prevent stripping of the transmission and sprocket gears.

The construction herein illustrated and described in detail constitutes the best practical embodiment of my invention that I have as yet devised, but I would have it understood that in the future practice of the invention such changes or modifications may be made as do not involve departure from the scope of my invention as defined in the claims appended.

Having described my invention, what I claim and desire to secure by Letters-Patent, is:

1. In a spring wheel, the combination with an inner annular member comprising annular plates spaced apart, and cross bars fixedly connecting the said annular plates at intervals, and an outer annular member surrounding and separated by an intervening space from the inner member, of springs connected with and curved about the said cross bars and also connected with the inner side of the outer annular member and having on their edges shoes disposed at right angles to the springs and opposed to the inner sides of the annular plates comprised in the inner annular member.

2. In a spring wheel, the combination with an inner annular member comprising annular plates spaced apart, cross bars fixedly connecting the said plates at intervals, spokes, and brackets fixed with respect to the spokes and straddling the annular plates, and an outer annular member surrounding and separated by an intervening space from the inner member, said outer member being provided with threaded sockets of springs connected with and curved about the said cross bars of the inner member and having on their edges shoes disposed at right angles to the springs and opposed to the inner sides of the annular plates comprised in the inner annular member, normally concavo-convex spring plates arranged on the outer end portions of the springs and having screw holes and roughened surfaces surrounding the same, and screws extending through said holes and into the threaded sockets in the outer annular member and having roughened surfaces on the inner sides of their heads opposed to the roughened surfaces of the spring plates.

In testimony whereof I have hereunto set my hand in presence of two subscribing witnesses.

GEORGE E. GARON.

Witnesses:
J. A. BOIVIN,
A. M. GILBERT.